United States Patent [19]

Takekoshi

[11] E Patent Number: Re. 31,805

[45] Reissued Date of Patent: Jan. 15, 1985

[54] METHOD FOR MAKING POLYIMIDES

[75] Inventor: Tohru Takekoshi, Scotia, N.Y.

[73] Assignee: General Electric Company, Schenectady, N.Y.

[21] Appl. No.: 571,323

[22] Filed: Jan. 16, 1984

Related U.S. Patent Documents

Reissue of:

[64] Patent No.: 4,324,882
Issued: Apr. 13, 1982
Appl. No.: 188,755
Filed: Sep. 19, 1980

[51] Int. Cl.[3] ..... C08G 73/10

[52] U.S. Cl. ..... 528/206; 528/14; 528/173; 528/336; 528/351

[58] Field of Search ..... 528/14, 173, 206, 336, 528/351

[56] References Cited

U.S. PATENT DOCUMENTS

| | | | |
|---|---|---|---|
| 3,847,870 | 11/1974 | Takekoshi | 528/14 |
| 3,850,885 | 11/1974 | Takekoshi et al. | 528/14 |
| 3,998,840 | 12/1976 | Williams et al. | 528/14 |

OTHER PUBLICATIONS

Hackh's Chemical Dictionary, 4th Edition, McGraw-Hill, NY, 1969, pp. 616-622.

*Primary Examiner*—Maurice J. Welsh
*Attorney, Agent, or Firm*—William A. Teoli; James C. Davis, Jr.; James Magee, Jr.

[57] ABSTRACT

A method is provided for making polyimides resulting from aromatic organic dianhydride and organic diamine interaction in the presence of an alkali metal salt of an oxygenated phosphorus compound.

13 Claims, No Drawings

METHOD FOR MAKING POLYIMIDES

Matter enclosed in heavy brackets [ ] appears in the original patent but forms no part of this reissue specification; matter printed in italics indicates the additions made by reissue.

CROSS REFERENCE TO RELATED APPLICATIONS

Reference is made to copending application Ser. No. 168,660, of Tohru Takekoshi and Howard J. Klopfer, Method for Making Polyetherimides Using Carboxylic Acid Salts With Alkali Metals or Zinc as Catalysts, filed July 11, 1980, and copending applications Ser. No. 188,754, filed Sept. 19, 1980, Method of Making Polyetherimide and Ser. No. 118,756, filed Sept. 19, 1980, A Method for Making Polyetherimide of Dwain M. White and David G. Keyes, filed concurrently herewith, where all of the aforementioned applications are assigned to the same assignee as the present invention.

BACKGROUND OF THE INVENTION

The present invention relates to a method for making polyimides by effecting reaction between an aromatic bis-anhydride and an organic diamine under melt or solution polymerization conditions. More particularly, the present invention relates to the use of alkali metal salts of oxygenated phosphorus compounds as polymerization catalysts for making polyimides.

Prior to the present invention, certain catalysts, such as sodium chloride and ferric sulfate, as shown by Williams et al, U.S. Pat. No. 3,998,840, assigned to the same assignee as the present invention, were used to enhance the rate of formation of polyetherimide under melt polymerization conditions. Although valuable results were achieved by such procedures, it was found that the aforementioned catalysts were either less effective or not effective when utilized for making polyetherimides from aromatic bis(ether anhydride) and organic diamine under solution polymerization conditions. In addition, the presence of chloride ion may interfere with the use of such polyetherimide in electronic applications. Various metal compounds were also used to catalyze polyetherimide formation by imideamine exchange reactions, as shown by U.S. Pat. No. 3,847,870, Takekoshi and U.S. Pat. No. 350,885, Takekoshi et al, assigned to the same assignee as the present invention. However, the nature of the polymerization is quite different from polyetherimide formation by the melt polymerization of aromatic bis(ether anhydride) and organic diamine, which is amine-anhydride interaction rather than imideamine exchange.

STATEMENT OF THE INVENTION

The present invention is based on the discovery that oxygenated phosphorus compounds of various alkali metals, for example, monosodium hypophosphite, can enhance the rate of formation of polyimide resulting from aromatic bisanhydride and organic diamine interaction under melt polymerization or solution polymerization conditions when such oxygenated phosphorus compounds are utilized in an effective amount in the polymerization mixture.

There is provided by the present invention a method for making polyimides which comprises (1) effecting reaction between a $C_{(6-30)}$ aromatic organic dianhydride and a $C_{(2-20)}$ organic diamine in the presence of an effective amount of an alkali metal salt of an oxygenated phosphorus compound and (2) recovering the polyimide from the mixture of (1).

Among the aromatic organic dianhydrides which can be utilized in the practice of the invention are aromatic bis(ether anhydride)s of the formula

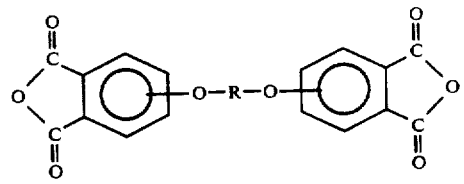

(1)

where R is a divalent aromatic organic radical having from 6–13 carbon atoms. In addition to the aromatic bis(ether anhydride) of formula (1), there also can be used other aromatic bisanhydrides, for example, pyromellitic dianhydride, 3,3',4,4'-benzophenonetetracarboxylic dianhydride, etc.

Organic diamines which can be utilized in the practice of the invention are included by the following formula, $$H_2NR^1NH_2, \quad (2)$$

where $R^1$ is a divalent organic radical selected from R radicals, alkylene radicals having from 2–20 carbon radicals, cyclo alkylene radicals and $C_{(2-8)}$ alkylene terminated polydiorganosiloxane radicals.

Radicals included by R are, for example, aromatic hydrocarbon radicals and halogenated aromatic hydrocarbon radicals, for example, phenylene, tolylene, chlorophenylene, naphthylene, etc., and radicals included by the formula, $$-R^2-(Q)_a-R^2-,$$

where $R^2$ is a divalent aromatic radical having 6–13 carbon atoms selected from hydrocarbon radicals and halogenated hydrocarbon radicals, and Q is a divalent organo radical selected from

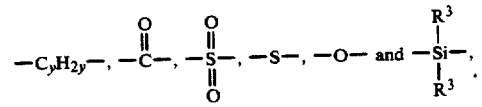

where a is 0 or 1, y is an integer having a value of from 1–5 inclusive, and $R^3$ is a monovalent hydrocarbon radical selected from methyl, phenyl, etc.

Radicals included by $R^1$ are, for example,

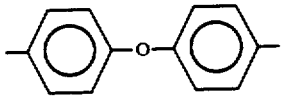

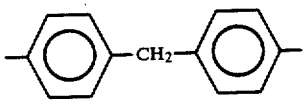

-continued

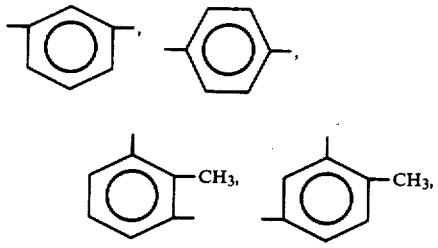

etc.; alkylene radicals such as hexamethylene, etc., cyclohexylene, etc.,

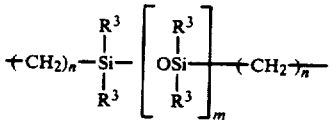

where $R^3$ is as defined above, m is equal to 0 to 100 inclusive and n is 2–8 inclusive.

Included by the aromatic bis(ether anhydride) of formula (1) which can be used in the practice of the present invention are, for example,

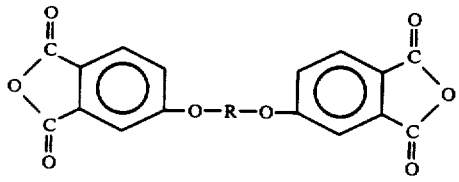

(3)

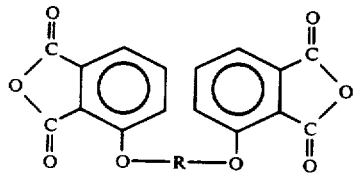

(4)

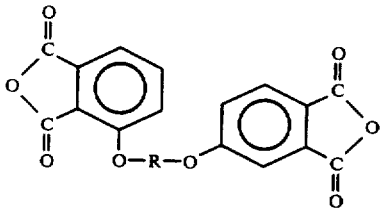

(5)

where R is as defined above.

Dianhydrides included by formula (4) are, for example, 2,2-bis[4-(2,3-dicarboxyphenoxy)phenyl]propane dianhydride;

4,4'-bis(2,3-dicarboxyphenoxy)diphenyl ether dianhydride;

1,3-bis(2,3-dicarboxyphenoxy)benzene dianhydride;

4,4'-bis(2,3-dicarboxyphenoxy)diphenylsulfide dianhydride;

1,4-bis(2,3-dicarboxyphenoxy)benzene dianhydride;

4,4'-bis(2,3-dicarboxyphenoxy)diphenylsulfone dianhydride; etc.

Dianhydrides included by formulas (3) and (5) are, for example, 2,2-bis[4-(3,4-dicarboxyphenoxy)-phenyl]propane dianhydride;

4,4'-bis(3,4-dicarboxyphenoxy)diphenyl ether dianhydride;

4,4'-bis(3,4-dicarboxyphenoxy)diphenyl sulfide dianhydride;

1,3-bis(3,4-dicarboxyphenoxy)benzene dianhydride;

1,4-bis(3,4-dicarboxyphenoxy)benzene dianhydride;

4,4'-bis(3,4-dicarboxyphenoxy)diphenylsulfone dianhydride;

4-(2,3-dicarboxyphenoxy)-4'-(3,4-dicarboxyphenoxy)2,2-diphenylpropane dianhydride, etc.

Included by the organic diamines of formula (2) are, for example, m-phenylenediamine;
p-phenylenediamine;
4,4'-diaminodiphenylpropane;
4,4-diaminodiphenylmethane;
benzidine;
4,4'-diaminodiphenylsulfide;
4,4'-diaminodiphenylsulfone;
4,4'-diaminodiphenyl ether;
1,5-diaminonapthalene;
3,3'-dimethylbenzidine;
3,3'-dimethoxybenzidine;
2,4-bis(β-amino-t-butyl)toluene;
bis(p-β-amino-t-butylphenyl)ether;
bis(p-β-methyl-o-aminopentyl)benzene;
1,3-diamino-4-isopropylbenzene;
1,2bis(3-aminopropoxy)ethane;
m-xylylenediamine;
p-xylylenediamine;
2,4-diaminotoluene;
2,6-diaminotoluene;
bis(4-aminocyclohexyl)methane;
3-methylheptamethylenediamine;
4,4-dimethylheptamethylenediamine;
2,11-dodecanediamine;
2,2-dimethylpropylenediamine;
octamethylenediamine;
3-methoxyhexamethylenediamine;
2,5-dimethylhexamethylenediamine;
2,5-dimethylheptamethylenediamine;
3-methylheptamethylenediamine;
5-methylnonamethylenediamine;
1,4-cyclohexanediamine;
1,12-octadecanediamine;
bis(3-aminopropyl)sulfide;
N-methyl-bis(3-aminopropyl)amine;
hexamethylenediamine;
heptamethylenediamine;
nonamethylenediamine;
decamethylenediamine;
bis-(3-aminopropyl)tetramethyldisiloxane;
bis-(4-aminobutyl)tetramethyldisiloxane; etc.

Oxygenated phosphorus compounds which can be employed as catalysts in the practice of the present invention, are for example, sodium orthophosphate;
disodium hydrogen orthophosphate;
sodium dihydrogen orthophosphate;
sodium hypophosphate;
sodium hypophosphite;
sodium pyrophosphate;
sodium metaphosphate;
sodium orthophosphite;
disodium orthophosphite;
sodium benzenephosphonate;
disodium benzenephosphonate;
sodium benzenephosphinate;

sodium toluenephosphonate;
sodium toluenephosphinate;
sodium diphenylphosphinate;
and the corresponding lithium and potassium salts of the above sodium salts.

In the practice of the present invention, reaction can be effected between the organic dianhydride and the organic diamine in the presence of the oxygenated phosphorus compound, referred to hereinafter as the "phosphorus catalyst" under solution polymerization conditions at a temperature in the range of from 120° C. to 250° C., or under melt polymerization conditions at a temperature in the range of from 200° C. to 350° C.

In instances where solution polymerization is practiced, there can be utilized various organic solvents, for example, chlorobenzene, dichlorobenzene, trichlorobenzene, xylene, ethylbenzene, trimethylbenzene, durene, biphenyl, diphenylether, etc., and mixtures of these solvents. It has been found that a proportion of about 0.8 to 1.2 moles of organic diamine, per mole of organic dianhydride can be employed while substantially equal molar amounts are preferred. The solids concentration of at least 5% by weight to 50% by weight has been found effective. The phosphorus catalyst can be employed at a concentration of about 0.001% to 0.5% and preferable 0.005% to 0.5%, based on the weight of the total solids. Reaction times will vary widely depending upon the particular aromatic organic dianhydride and organic diamine utilized, as well as the temperature of the reaction. However, an enhancement of the rate of reaction will be effected and readily discernable as a result of the use of the phosphorus catalyst.

In instances where melt polymerization is employed, substantially similar proportions of reactants and catalysts as described above for solution polymerization can be utilized in the absence of the organic solvent. Melt polymerization can be achieved satisfactorily in a melt extruder, as taught for example, by Mellinger et al, U.S. Pat. No. 4,073,773.

The polyetherimides made in accordance with the practice of the present invention can be employed as high performance injection moldable thermoplastics. Depending upon the nature of the organic dianhydride and the organic diamine utilized, the resulting polyimides also can be utilized in a variety of other applications, for example, insulation, films, wire coatings, glass and graphite fiber composites, laminates, etc.

In order that those skilled in the art will be better able to practice the invention, the following examples are given by way of illustration and not by way of limitation. All parts are by weight.

EXAMPLE 1

A mixture of 36.433 parts of 2,2-bis[4(3,4-dicarboxyphenoxy)phenyl]propane dianhydride, 7.5698 parts of meta-phenylenediamine and 83 parts of o-dichlorobenzene was stirred and heated to reflux under nitrogen. The water formed was continuously removed by recirculating the overhead condensate of o-dichlorobenzene through a bed of molecular sieve. The rate of increase in molecular weight was followed by measurement of intrinsic viscosity of aliquot samples against polymerization time.

In addition to the above procedure, which was used as the control, the same procedure was repeated except that there was employed a phosphorus catalyst at a concentration of 10 parts per million of sodium ion or equivalent molar amount of lithium or potassium ion, based on the estimated weight of polymer formed. The results are shown in Table I, where the intrinsic viscosities were measured in chloroform at 25° C.

TABLE I

High Temperature Solution Polymerization of Polyetherimide in the Presence of Various Catalysts

| Catalysts | Concentration of $Na^+$ (PPM) | Intrinsic Viscosities (dl/g) 40 Min. | 60 Min. | 100 Min. |
|---|---|---|---|---|
| Control | 0 | 0.23 | 0.25 | 0.28 |
| Monosodium Hypophosphite | 10 | 0.27 | 0.32 | 0.46 |
| Monosodium Hypophosphite | 20 | 0.42 | 0.52 | 0.67 |
| Monosodium Phosphate | 10 | 0.25 | 0.27 | 0.31 |
| Disodium Phosphate | 10 | 0.28 | 0.33 | 0.39 |
| Monosodium Benzene-phosphinate | 10 | 0.38 | 0.49 | 0.66 |
| Monosodium Benzene-phosphonate | 10 | 0.31 | 0.35 | 0.42 |
| Disodium Benzene-phosphonate | 10 | 0.31 | 0.35 | 0.42 |
| Sodium Diphenyl-phosphinate | 10 | 0.31 | 0.36 | 0.44 |
| Lithium Benzene-phosphinate | 3.02 ($Li^+$) | 0.26 | 0.30 | 0.34 |
| Postassium Benzene-phosphinate | 17.0 ($K^+$) | 0.34 | 0.44 | 0.57 |

EXAMPLE 2

A mixture containing 65.99 parts of 2,2-bis[4-(3,4-dicarboxyphenoxy)phenyl]propane dianhydride, 13.30 parts of m-phenylenediamine and 0.71 parts of aniline was placed in a Vertical Helicone Mixer (Atlantic Research). The mixture was stirred under nitrogen and heated at 275° C. The rate of increase in molecular weight was followed by measurement of intrinsic viscosity of small amount of samples withdrawn at 15, 30 and 45 minutes.

In addition to the above, the same experiment was repeated except that 0.0054 part of sodium benzene-phosphinate was employed as a catalyst. The results are shown in Table II, where the intrinsic viscosities were measured in chloroform at 25° C.

TABLE II

Melt Polymerization of Polyetherimides in the Presence of Catalyst

| Catalyst | Catalyst Concentration | Intrinsic Viscosity dl/g at 15 min | 30 min | 45 min |
|---|---|---|---|---|
| None | 0 | 0.29 | 0.37 | 0.43 |
| Sodium Benzene-phosphinate | 70 ppm | 0.39 | 0.47 | 0.50 |

EXAMPLE 3

A mixture consisting of 59.42 parts of 4,4'-bis(3,4-dicarboxyphenoxy)diphenyl sulfide dianhydride, 23.79 parts of 4,4'-diaminodiphenylmethane and 1.07 parts of phthalic anhydride was placed in a Vertical Helicone Mixer. The mixture was stirred under nitrogen and heated at 275° C. The increase of molecular weight was followed by measuring intrinsic viscosities of several samples withdrawn during the polymerization. (Table III).

An additional melt polymerization was performed in the same manner as above, except that 0.004 part of potassium benzenephosphinate was used as a catalyst. The results are shown in Table III, where the intrinsic viscosities were measured in N-methylpyrrolidone at 25° C.

TABLE III

Melt Polymerization of Polyetherimides in the Presence of Catalyst

| Catalyst | Catalyst Concentration | Intrinsic Viscosity (dl/g) at 20 min. | 30 min | 40 min. |
|---|---|---|---|---|
| None | 0 | 0.33 | 0.38 | 0.43 |
| potassium benzene-phosphate | 50 ppm | 0.41 | 0.50 | 0.56 |

Although the above examples are directed to only a few of the very many variables of the present invention, it should be understood that the present invention is directed to a much broader method of making polyimides utilizing the organic dianhydrides of formula (1) and the organic diamines of formula (2) in the presence of a much broader variety of oxygenated phosphorus catalysts in accordance with the practice of the present invention.

What I claim as new and desire to secure by Letters Patent of the United States is:

1. A method for making polyimides which comprises
(1) effecting reaction between a $C_{(6-30)}$ aromatic organic dianhydride and a $C_{(2-20)}$ organic diamine in the presence of an effective amount of an alkali metal salt of an oxygenated phosphorus compound, selected from the group consisting of orthophosphates, dihydrogen orthophosphates, hypophosphates, pyrophosphates, metaphosphates, orthophosphites, [and] arylphosphonates and *arylphosphinates, and*
(2) recovering the resulting polyetherimide from the mixture of (1).

2. A method in accordance with claim 1 where the aromatic organic dianhydride has the formula,

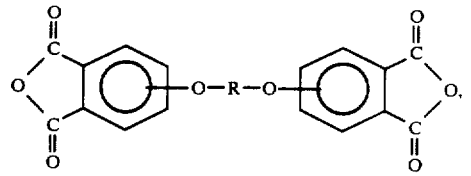

where R is a divalent aromatic organic radical having from 6–13 carbon atoms.

3. A method in accordance with claim 1, where the organic diamine has the formula, $H_2NR^1NH_2$, where $R^1$ is a divalent organic radical selected from R radicals, alkylene radicals having from 2–20 carbon radicals, cyclo alkylene radicals and $C_{(2-8)}$ alkylene terminated polydiorganosiloxane radicals.

4. A method in accordance with claim 1, where the reaction is effected in the presence of organic solvent.

5. A method in accordance with claim 1, where the reaction is effected under melt conditions.

6. A method in accordance with claim 2, where the organic dianhydride has the formula,

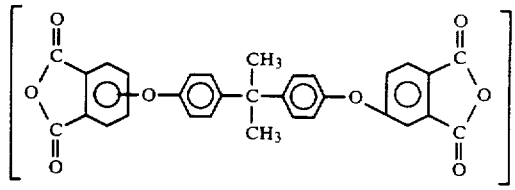

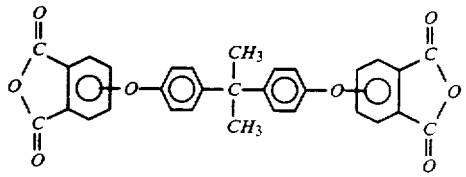

7. A method in accordance with claim 3, where the organic diamine is meta-phenylenediamine.

8. A method in accordance with claim 3, where the organic diamine is para-phenylenediamine.

9. A method in accordance with claim 1, where the alkali metal salt is monosodium hypophosphite.

10. A method in accordance with claim 1, where the alkali metal salt is sodium phenylphosphite.

11. A method in accordance with claim 1, where the alkali metal salt is potassium phenylphosphite.

*12. A method in accordance with claim 1, where the alkali metal salt is potassium phenylphosphinate.*

*13. A method in accordance with claim 1, where the alkali metal salt is sodium phenylphosphinate.*

* * * * *